United States Patent
Koskinen et al.

(10) Patent No.: US 12,336,045 B1
(45) Date of Patent: Jun. 17, 2025

(54) MEASUREMENT RELAXATION

(71) Applicant: Nokia Technologies Oy, Espoo (FI)

(72) Inventors: Jussi-Pekka Koskinen, Oulu (FI); Samuli Heikki Turtinen, Oulu (FI); Lei Du, Beijing (CN); Lars Dalsgaard, Oulu (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 19/019,804

(22) Filed: Jan. 14, 2025

(30) Foreign Application Priority Data

Jan. 19, 2024 (WO) ................ PCT/CN2024/073377

(51) Int. Cl.
*H04W 48/02* (2009.01)
*H04W 24/08* (2009.01)
*H04W 76/28* (2018.01)

(52) U.S. Cl.
CPC ........... *H04W 76/28* (2018.02); *H04W 24/08* (2013.01); *H04W 48/02* (2013.01)

(58) Field of Classification Search
CPC ...... H04W 76/28; H04W 24/08; H04W 48/02
See application file for complete search history.

(56) References Cited

U.S. PATENT DOCUMENTS

2017/0273136 A1* 9/2017 Siomina ............ H04W 52/0216
2022/0322234 A1* 10/2022 Niu ................... H04W 52/0274

FOREIGN PATENT DOCUMENTS

WO 2022/186575 A1 9/2022
WO 2023/216264 A1 11/2023

OTHER PUBLICATIONS

Ericsson, RLM and BFD relaxation and No. DRX, May 22-26, 2023, 3GPP TSG-RAN2 Meeting #122, R2-2305912, Incheon, South Korea, (Year: 2023).*
"3rd Generation Partnership Project; Technical Specification Group Radio Access Network; NR; Requirements for support of radio resource management (Release 18)", 3GPP TS 38.133, V18.3.0, Sep. 2023, 6091 pages.
"[NR_UE_pow_sav_enh-Core]CR on maintaining RLM/BFD relaxation requirements R17", 3GPP TSG-RAN4 Meeting #109, R4-2321620, Huawei, Nov. 13-17, 2023, 3 pages.
"RLM and BFD relaxation and no DRX", 3GPP TSG-RAN2 Meeting #122, R2-2305912, Agenda: 6.1.3.1, Ericsson, May 22-26, 2023, pp. 1-4.
"3rd Generation Partnership Project; Technical Specification Group Radio Access Network; NR; User Equipment (UE procedures in Idle mode and RRC Inactive state (Release 17)", 3GPP TS 38.304, V17.6.0, Sep. 2023, pp. 1-53.

(Continued)

*Primary Examiner* — Said M Elnoubi
(74) *Attorney, Agent, or Firm* — Nokia Technologies Oy (57) ABSTRACT

Example embodiments of the present disclosure relate to measurement relaxation. In an aspect, a terminal device determines a short discontinuous reception (DRX) cycle and a long DRX cycle configured for the terminal device. Based on at least one of the short DRX cycle or the long DRX cycle, the terminal device determines at least one of (i) whether the terminal device is allowed to relax a measurement, or (ii) a relaxed evaluation period for the measurement. In this way, the UE behavior is predictable and thus communication efficiency or effectiveness in a communication system can be improved.

8 Claims, 8 Drawing Sheets

(56) References Cited

OTHER PUBLICATIONS

"Correction on RLM/BFD relaxation state reporting", 3GPP TSG-RAN WG2 Meeting #121-bis electronic, R2-2302800, Nokia, Apr. 17-26, 2023, 4 pages.

International Search Report and Written Opinion received for corresponding Patent Cooperation Treaty Application No. PCT/CN2024/073377, dated Sep. 9, 2024, 17 pages.

"Discussion about RLM/BFD measurement relaxation", 3GPP TSG-RAN WG4 Meeting # 104-e, R4-2212274, Agenda: 9.12.1, Nokia, Aug. 15-26, 2022, 4 pages.

\* cited by examiner

MEASUREMENT RELAXATION

RELATED APPLICATION

This application claims priority from WO Patent Application No. PCT/CN2024/073377, filed on Jan. 19, 2024, which is hereby incorporated in its entirety.

FIELD

Example embodiments of the present disclosure generally relate to the field of communications, and in particular, to devices, methods, apparatuses and a computer readable storage medium for measurement relaxation.

BACKGROUND

A communication network can be seen as a facility that enables communications between two or more communication devices, or provides communication devices access to a data network. A mobile or wireless communication network is one example of a communication network. A communication device may be provided with a service by an application server.

Such communication networks operate in according with standards such as those provided by 3GPP (Third Generation Partnership Project) or ETSI (European Telecommunications Standards Institute). Examples of standards are the so-called 5G (5th Generation) standards provided by 3GPP.

SUMMARY

In general, example embodiments of the present disclosure provide a solution for measurement relaxation, especially for radio link monitoring (RLM) measurement and beam failure detection (BFD) measurement.

In a first aspect, there is provided a terminal device. The terminal device comprises at least one processor and at least one memory storing instructions that, when executed by the at least one processor, cause the terminal device at least to: determine a short discontinuous reception (DRX) cycle and a long DRX cycle configured for the terminal device, and determine, based on at least one of the short DRX cycle or the long DRX cycle, at least one of (i) whether the terminal device is allowed to relax a measurement, or (ii) a relaxed evaluation period for the measurement.

In a second aspect, there is provided a terminal device. The terminal device comprises at least one processor and at least one memory storing instructions that, when executed by the at least one processor, cause the terminal device at least to: determine a short discontinuous reception (DRX) cycle and a long DRX cycle configured for the terminal device; detect a transition from using one of the short DRX cycle or the long DRX cycle to using the other one of the short DRX cycle and the long DRX cycle; and prevent from reporting a relaxation state of the measurement due to the transition.

In a third aspect, there is provided a method. The method comprises determining a short discontinuous reception (DRX) cycle and a long DRX cycle configured for the terminal device, and determining, based on at least one of the short DRX cycle or the long DRX cycle, at least one of (i) whether the terminal device is allowed to relax a measurement, or (ii) a relaxed evaluation period for the measurement.

In a fourth aspect, there is provided a method. The method comprises determining a short discontinuous reception (DRX) cycle and a long DRX cycle configured for the terminal device; detecting a transition from using one of the short DRX cycle or the long DRX cycle to using the other one of the short DRX cycle and the long DRX cycle; and preventing from reporting a relaxation state of the measurement due to the transition.

In a fifth aspect, there is provided an apparatus. The apparatus comprises means for determining a short discontinuous reception (DRX) cycle and a long DRX cycle configured for the terminal device, and means for determining, based on at least one of the short DRX cycle or the long DRX cycle, at least one of (i) whether the terminal device is allowed to relax a measurement, or (ii) a relaxed evaluation period for the measurement.

In a sixth aspect, there is provided an apparatus. The apparatus comprises means for determining a short discontinuous reception (DRX) cycle and a long DRX cycle configured for the terminal device; means for detecting a transition from using one of the short DRX cycle or the long DRX cycle to using the other one of the short DRX cycle and the long DRX cycle; and means for preventing from reporting a relaxation state of the measurement due to the transition.

In a seventh aspect, there is provided a non-transitory computer readable medium comprising program instructions for causing an apparatus to perform at least the method according to the third aspect and the fourth aspect.

In an eighth aspect, there is provided a computer program comprising instructions, which, when executed by an apparatus, cause the apparatus at least to perform at least the method according to at least one of the third aspect and the fourth aspect.

In a ninth aspect, there is provided a terminal device. The terminal device comprises determining circuitry configured to determine a short discontinuous reception (DRX) cycle and a long DRX cycle configured for the terminal device, and determining circuitry configured to determine, based on at least one of the short DRX cycle or the long DRX cycle, at least one of (i) whether the terminal device is allowed to relax a measurement, or (ii) a relaxed evaluation period for the measurement.

In a tenth aspect, there is provided a terminal device. The terminal device comprises determining circuitry configured to determine a short discontinuous reception (DRX) cycle and a long DRX cycle configured for the terminal device; detecting circuitry configured to detect a transition from using one of the short DRX cycle or the long DRX cycle to using the other one of the short DRX cycle and the long DRX cycle; and preventing circuitry configured to prevent from reporting a relaxation state of the measurement due to the transition.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, in which.

Throughout the drawings, the same or similar reference numerals represent the same or similar elements.

DETAILED DESCRIPTION

Principles of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof. As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

As used in this application, the term "circuitry" may refer to one or more or all of the following:

(a) hardware-only circuits (such as in analog and/or digital circuits) and (b) combinations of hardware circuits and software, such as (as applicable):

(i) a combination of analog and/or digital hardware circuit(s) with software (e.g., firmware); and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (for example, firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "cellular network" refers to a network operating in accordance with any suitable radio access technology defined by standards, such as Long Term Evolution (LTE), LTE-Advanced (LTE-A), new radio Wideband Code Division Multiple Access (WCDMA), High-Speed Packet Access (HSPA), Narrow Band Internet of Things (NB-IoT) and so on. Furthermore, the communications between a terminal device and a network device of a cellular network may be performed according to any suitable communication protocols, including, but not limited to, the fourth generation (4G), 4.5G, the future fifth generation (5G) communication protocols, and/or any other protocols either currently known or to be developed in the future. Embodiments of the present disclosure may be applied in various cellular networks. Given the rapid development in communications, there will of course also be future type communication technologies and systems with which the present disclosure may be embodied. It should not be seen as limiting the scope of the present disclosure to only the aforementioned system.

As used herein, the term "network device" refers to any device in a cellular network via which a terminal device accesses a data network and receives services exposed by other network devices of the cellular network. In some examples, a network device may comprise or implement a network function of a $5^{th}$ generation communication system (5GS) (e.g., a core network) of a cellular network. In some examples, the network devices may be located at the RAN of the 5GS. The network device may be part of a satellite, a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico node, and so forth, depending on the applied terminology and technology. A gNB may include a centralized unit CU and one or more distributed DUs. Femto and Pico nodes are small base stations with a small coverage area.

The term "terminal device" refers to a device of a communication system of a cellular network, such as a $5^{th}$ generation communication system (5GS) that may be capable of wireless (e.g., radio) communication with a NR-RAN of the 5GS). By way of example rather than limitation, a terminal device may also be referred to as a wireless communication device, user equipment (UE), a Subscriber Station (SS), a Portable Subscriber Station, a Mobile Station (MS), or an Access Terminal (AT). Examples of a terminal device include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (for example, remote surgery), an industrial device and applications (for example, a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

A user equipment (UE) can be configured with discontinuous reception (DRX). Such configuration can include a long DRX and additionally a short DRX. Hence, the UE can be configured with a short DRX cycle and a long DRX cycle. However, the UE may be no longer allowed to relax RLM or BFD measurements when the configured DRX cycle is longer than, for example, 80 ms. The UE behavior is not clear when UE is configured with a short DRX cycle which is shorter than, for example, 80 ms and a long DRX cycle which is longer than, for example, 80 ms. It is not clear whether the UE is allowed or not to relax RLM/BFD measurements. Without clear and defined UE behavior, the network is not capable of determining the expected UE behaviour. Hence, without defining the UE behavior, different UEs in the field may be implemented and behave differently when configured with long and short DRX and allowed also RLM/BFD relaxation. This will make it complex for the network to use the features together.

In some scenarios, a network is aware when the UE is using a short DRX cycle or a long DRX cycle for Physical Downlink Control Channel (PDCCH) monitoring. Therefore, it causes unnecessary signaling and UE power consumption is increased if the UE initiates UE Assistance Information procedure for reporting of its RLM and/or BFD relaxation status every time when transitioning from using the short DRX cycle to using the long DRX cycle (or from using the long DRX cycle to using the short DRX cycle).

In addition, the UE behavior is not clear when the configured short DRX cycle is shorter than, for example, 80 ms and the long DRX cycle is longer than, for example, 80 ms. It is not clear if the UE is allowed or not to relax RLM/BFD measurements in this case and whether the UE should report its RLM and/or BFD relaxation status accordingly.

In view of the above, example embodiments of the present disclosure provide a solution for measurement relaxation. In the example embodiments of the present disclosure, a terminal device may determine a short discontinuous reception (DRX) cycle and a long DRX cycle configured for the terminal device. Based on at least one of the short DRX cycle or the long DRX cycle, the terminal device may determine at least one of (i) whether the terminal device is allowed to relax a measurement, or (ii) a relaxed evaluation period for the measurement. In this way, the UE behavior is predictable and thus communication efficiency or effectiveness in a communication system can be improved.

Figure 1A:
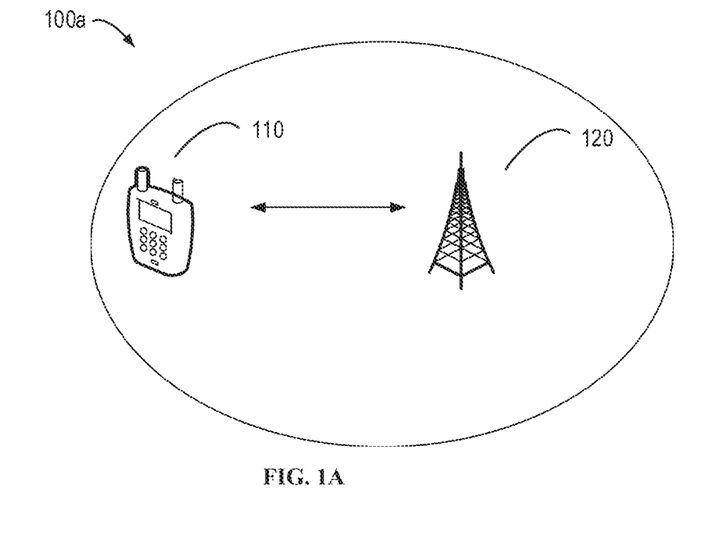
FIG. 1A illustrates an example of a network environment in which example embodiments of the present disclosure can be implemented.

FIG. 1A illustrates an example of a network environment 100a in which example embodiments of the present disclosure can be implemented. The environment 100a may be a part of a communication network and comprise a plurality of terminal devices and network devices, such as a terminal device 110, a network device 120. As an example, the terminal device 110 may be implemented as a User Equipment (UE) or an Access Terminal (AT), and the network device 120 may be implemented as a base station (BS). The network device 120 may transmit various data to the terminal device 110 via network environment 100a.

To transmit data and/or control information, the terminal device 110 may perform communications with the network device 120. A link from the network device 120 to the terminal device 110 is referred to as a downlink (DL), while a link from the terminal device 110 to the network device 120 is referred to as an uplink (UL).

Although the terminal device 110 and the network device 120 are described in the communication environment 100a of FIG. 1A, embodiments of the present disclosure may equally apply to any other suitable communication devices in communication with one another. That is, embodiments of the present disclosure are not limited to the exemplary scenarios of FIG. 1A. In this regard, it is noted that although the terminal device is schematically depicted as a mobile phone and the network device 120 is schematically depicted as a base station in FIG. 1A, it is understood that these depictions are exemplary in nature without suggesting any limitation. In other embodiments, the terminal device 110 and the network device 120 may be any other communication devices, for example, any other wireless communication devices.

It is to be understood that the particular number of various communication devices and the particular number of various communication links as shown in FIG. 1A is for illustration purpose only without suggesting any limitations. The communication environment 100a may include any suitable number of communication devices and any suitable number of communication links for implementing embodiments of the present disclosure. In addition, it should be appreciated that there may be various wireless as well as wireline communications (if needed) among all of the communication devices.

Figure 1B:
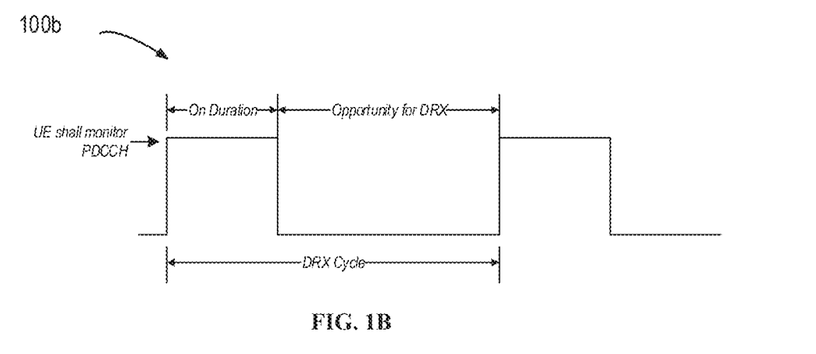
FIG. 1B illustrates a discontinuous reception (DRX) cycle related to some embodiments of the present disclosure.

FIG. 1B illustrates a discontinuous reception (DRX) cycle 100b related to some embodiments of the present disclosure. UE power saving may be achieved by the terminal device or UE 110 relaxing measurements for RLM/BFD. When configured, the UE may determine whether it is in a low mobility state and/or whether its serving cell radio link quality is better than a threshold. The configuration for the low mobility and a good serving cell quality criterion is provided through dedicated RRC signalling. The RLM and BFD relaxation may be enabled/disabled separately through one or more RRC configurations. Additionally, RLM relaxation may be enabled/disabled on per Cell Group basis while BFD relaxation may be enabled/disabled on per serving cell basis.

The UE is allowed to perform RLM and/or BFD relaxation when relaxed measurement criterion for low mobility and/or for good serving cell quality is met. If configured to do so, the UE may trigger reporting of its RLM and/or BFD relaxation status through UE assistance information if the UE changes its respective RLM and/or BFD relaxation status while meeting the UE minimum requirements.

The UE may not be allowed to relax RLM measurements and apply the relaxed radio link monitoring if at least one of the following conditions is met: the UE sends out of sync indications to the higher layers; the timer T310 is running; or no DRX is configured or configured DRX cycle 100b is longer than, for example, 80 ms. The UE may not be allowed to relax BFD measurements and apply the relaxed link recovery procedures if at least one of the following conditions is met: the timer beamFailureDetectionTimer is running; or no DRX is configured or configured DRX cycle 100b is longer than, for example, 80 ms.

When DRX 100b is configured, the UE does not have to continuously monitor PDCCH. An on-duration is duration that the UE may at least wait to receive PDCCHs after waking up. If the UE successfully decodes a PDCCH, the UE may stay awake and start the inactivity timer. An inactivity-timer is duration that the UE may wait to successfully decode a PDCCH, from the last successful decoding of a PDCCH, failing which it may go back to sleep. The UE may restart the inactivity timer following a single successful decoding of a PDCCH for a first transmission only (i.e., not for retransmissions). A retransmission-timer is duration until a retransmission can be expected. The cycle may specify the periodic repetition of the on-duration followed by a possible period of inactivity.

An active-time is total duration that the UE monitors PDCCH. It may include the "on-duration" of the DRX cycle, the time UE is performing continuous reception while the inactivity timer has not expired, and the time when the UE is performing continuous reception while waiting for a retransmission opportunity. The UE may also be configured with a short DRX cycle which is used after expiry of drx-InactivityTimer or if the UE receives a DRX Command MAC CE.

When DRX is configured, the MAC entity may start or restart drx-ShortCycleTimer for this DRX group in the first symbol after the expiry of drx-InactivityTimer and use the short DRX cycle for this DRX group if drx-Inactivity Timer for a DRX group expires and the short DRX cycle is configured. Otherwise, the MAC entity may use the long DRX cycle for this DRX group.

If a DRX Command MAC CE indicated by PDCCH addressed to C-RNTI or CS-RNTI, or by a configured downlink assignment for unicast transmission is received and the short DRX cycle is configured, the MAC entity may start or restart drx-ShortCycleTimer for each DRX group in the first symbol after the end of DRX Command MAC CE reception and use the short DRX cycle for each DRX group. Otherwise, the MAC entity may use the long DRX cycle for each DRX group.

If drx-ShortCycleTimer for a DRX group expires, the MAC entity may use the long DRX cycle for this DRX group. If a long DRX Command MAC CE is received, the MAC entity may stop drx-ShortCycleTimer for each DRX group and use the long DRX cycle for each DRX group.

If the short DRX cycle is used for a DRX group, and [(SFN×10)+subframe number]modulo (drx-ShortCycle)= (drx-StartOffset) modulo (drx-ShortCycle), the MAC entity may start drx-onDurationTimer for this DRX group after drx-SlotOffset from the beginning of the subframe.

Figure 2A:
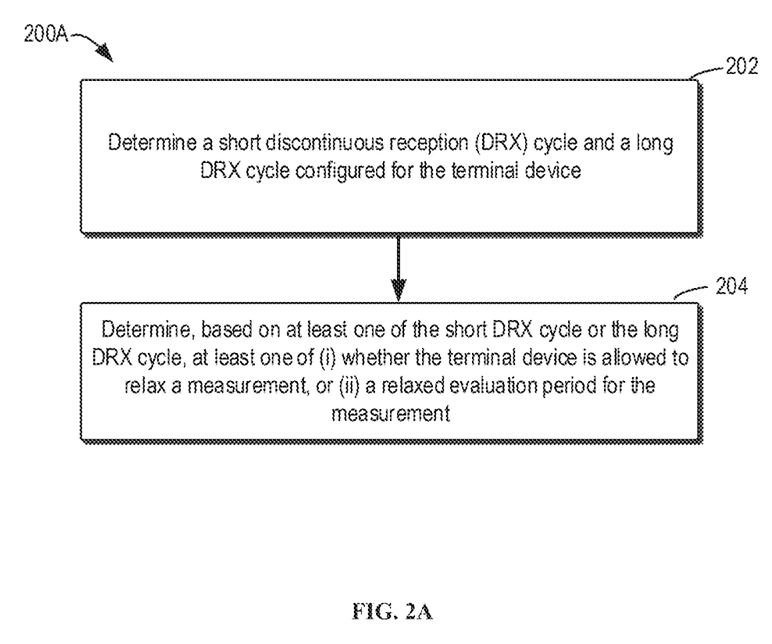
FIG. 2A illustrates a flow chart of method according to some embodiments of the present disclosure.

FIG. 2A illustrates a flowchart of method according to some embodiments of the present disclosure. For the purpose of discussion, the method 200a will be described with reference to FIG. 1A. It would be appreciated that although the process flow 200a has been described referring to FIG. 1A, this process flow 200a may be likewise applied to other similar communication scenarios.

In the process flow 200a, the terminal device 110 may determine (202) determine a short discontinuous reception (DRX) cycle and a long DRX cycle configured for the terminal device. Based on the short DRX cycle or the long DRX cycle (or based on both), the terminal device 110 may determine (204) whether the terminal device is allowed to relax a measurement, or determine a relaxed evaluation period for the measurement, or both.

For example, in some embodiments, the terminal device 110 may determine that the terminal device 110 is allowed to relax the measurement regardless of the long DRX cycle based on determining that the short DRX cycle is less than or equal to a threshold duration. In some other embodiments, the terminal device 110 may determine that the terminal device is allowed to relax the measurement based on determining that the short DRX cycle is less than or equal to a threshold duration and the long DRX cycle is greater than the threshold duration.

In some further embodiments, the terminal device 110 may determine that the terminal device is allowed to relax the measurement based on determining that the short DRX cycle is less than or equal to a threshold duration. Alternatively, or additionally, the terminal device 110 may determine that the terminal device is not allowed to relax the measurement based on determining that the short DRX cycle is greater than the threshold duration.

In some example embodiments, the terminal device 110 may determine whether the terminal device is allowed to exit the relaxed measurement based on the short DRX cycle.

In some other examples, the terminal device 110 may determine an evaluation period for the measurement by, based on determining that the short DRX cycle is less than or equal to a threshold duration and the long DRX cycle is greater than the threshold duration, determining the relaxed evaluation period based on the DRX cycle which the terminal device 110 uses to determine that the terminal device 110 is allowed to relax the measurement.

In some further examples, the terminal device 110 may determine the evaluation period for the measurement by, based on determining that both the short DRX cycle and the long DRX cycle are less than or equal to a threshold duration, determining the relaxed evaluation period based on either the short DRX cycle or the long DRX cycle. Which DRX cycle to use for determining the relaxed evaluation period may be predefined e.g. using the long DRX cycle, indicated by UE e.g. in UE capability or configured by network.

In some embodiments, the terminal device 110 may determine the evaluation period for the measurement by, based on determining that the terminal device is allowed to relax the measurement, determining the relaxed evaluation period for evaluating if the downlink radio link quality becomes worse than a threshold based on one of the long and short DRX cycle. Alternatively or additionally, the terminal device 110 may determine the evaluation period for the measurement by determining the relaxed evaluation period for evaluating if the downlink radio link quality becomes better than a threshold based on the other one of the long DRX cycle and the short DRX cycle.

Alternatively, or additionally, the threshold duration may be 80 milliseconds or any other appropriate time length.

In some example embodiments, the measurement comprises radio link monitoring (RLM) measurement and/or beam failure detection (BFD) measurement.

Figure 2B:
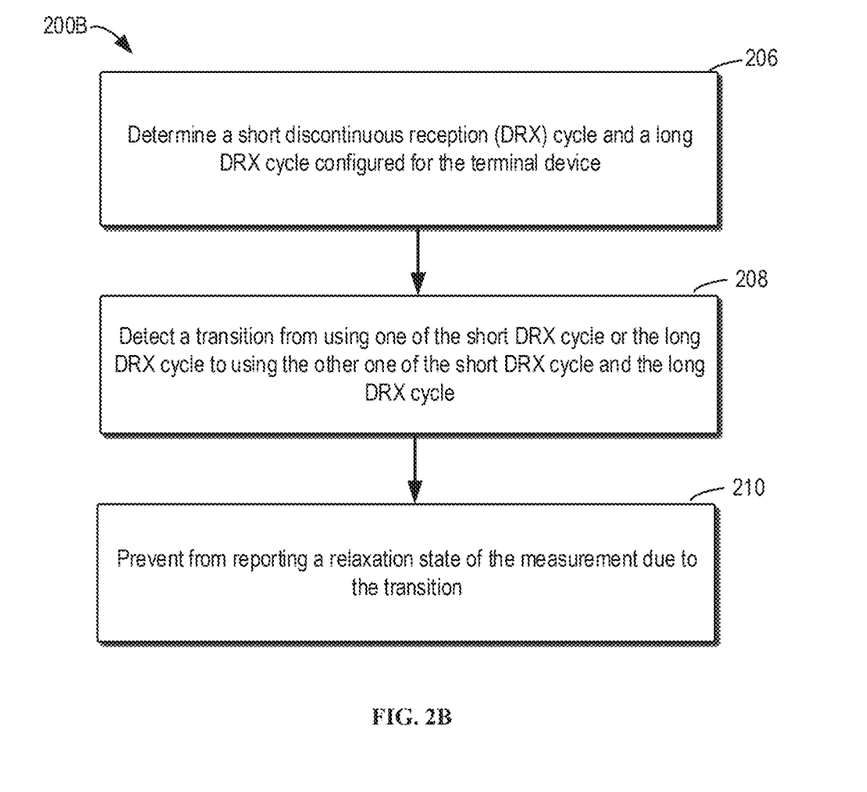
FIG. 2B illustrates a flow chart of method according to some embodiments of the present disclosure.

FIG. 2B illustrates a flowchart of method according to some embodiments of the present disclosure. For the purpose of discussion, the method 200b will be described with reference to FIG. 1A. It would be appreciated that although the process flow 200b has been described referring to FIG. 1A, this process flow 200b may be likewise applied to other similar communication scenarios.

In the process flow 200b, the terminal device 110 may firstly determine (206) a short discontinuous reception (DRX) cycle and a long DRX cycle configured for the terminal device. Then, the terminal device 110 may detect (208) a transition from using one of the short DRX cycle or the long DRX cycle to using the other one of the short DRX cycle and the long DRX cycle. The terminal device 110 may prevent (210) from reporting a relaxation state of the measurement due to the transition.

In some other embodiments, the terminal device 110 may determine that a relaxation state of a measurement is changed due to transition. In some example embodiments, the terminal device 110 may determine whether the terminal device is allowed to relax a measurement based on the short DRX cycle or the long DRX cycle, or based on both.

In some embodiments, the terminal device 110 may prevent from initiating a UE assistance information procedure for reporting the relaxation state of the measurement. In some examples, the terminal device 110 may exclude the reporting of the relaxation state of the measurement from a UE assistance information procedure. In some examples, the terminal device 110 may determine that a relaxation state of a measurement is changed due to reasons (such as, mobility, good channel quality) other than the transitioning, and the terminal device 110 may then report the current relaxation state of the measurement.

In some examples, the terminal device 110 may compare the relaxation state of the measurement with a previously reported relaxation state of the measurement. The terminal device 110 may report the current relaxation state of the measurement based on determining that the relaxation state is different from the previously reported relaxation state. The reporting may comprise initiating a UE assistance information procedure for reporting the relaxation state of the measurement. In some further embodiments, the terminal device 110 may prevent from reporting the current relaxation state of the measurement based on determining that the relaxation state is the same as the previously reported relaxation state. Alternatively, or additionally, the measurement may comprise radio link monitoring (RLM) measurement and/or beam failure detection (BFD) measurement.

Figure 2C:
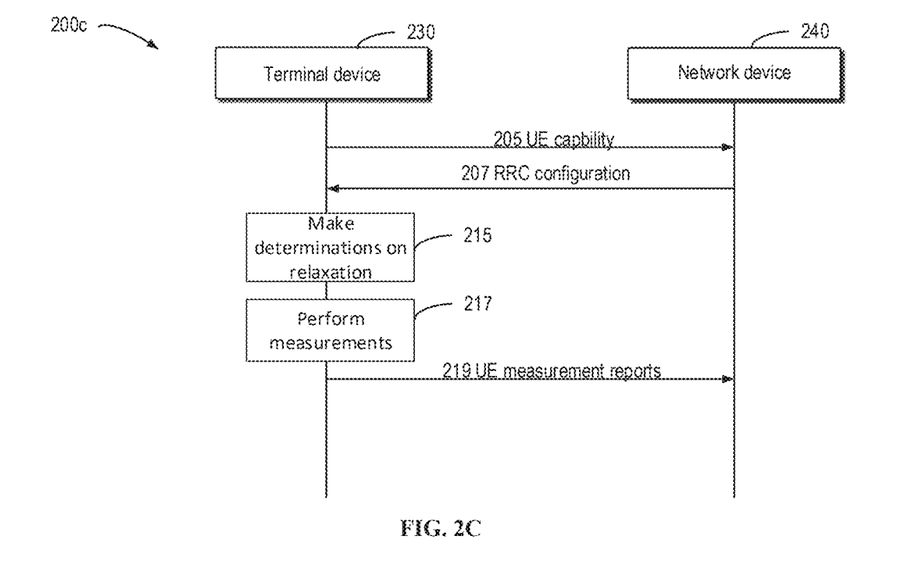
FIG. 2C illustrates a flow chart of method according to some embodiments of the present disclosure.

FIG. 2C illustrates a flowchart of method according to some embodiments of the present disclosure. It is noted that the process flow 200c can be deemed as a further example of the FIG. 1A. For example, the terminal device 230 may be one of the example devices of the terminal device 110, and the network device 240 may be one of the example devices of the network device 120. It is to be understood that these devices are described only for the purpose of illustration without suggesting any limitation as to the scope of the disclosure.

In some embodiments, the network device 240 may configure DRX cycles to the terminal device 230, and the terminal device 230 may transmit a capability indication 205 to the network device 240 indicating preferred DRX cycle for relaxation and whether the terminal device is capable of per cell group (per-CG) relaxed measurement.

In some other embodiments, the network device 240 may transmit a RRC reconfiguration 207 to the terminal device 230 including relaxation configuration and DRX cycle. In some embodiments, the terminal device 230 may make (215) determinations on whether to relax measurements. In some further embodiments, the terminal device 230 may perform (217) measurements based on relaxed or not relaxed behavior. The terminal device may transmit measurement reports 219 to the network device 240.

Figure 3:
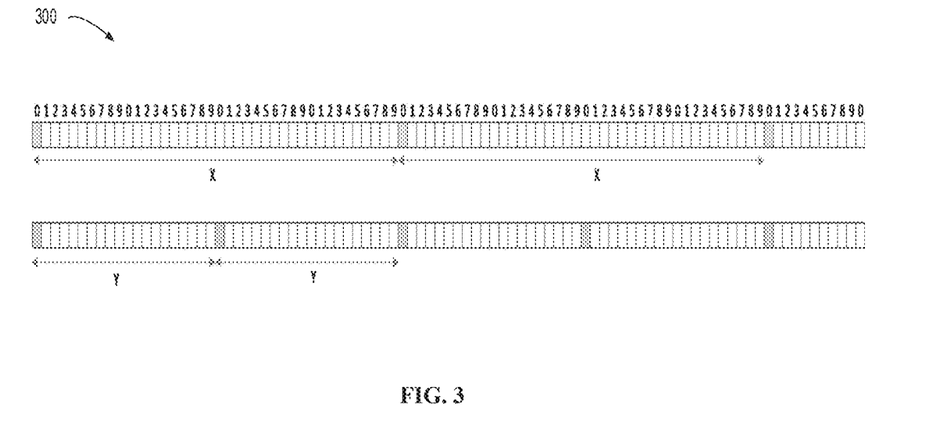
FIG. 3 illustrates some principles of the rules according to some embodiments of the present disclosure.

FIG. 3 illustrates some principles of the rules 300 according to some embodiments of the present disclosure. It is noted that the process flow 300 can be deemed as a further example of the process flow 200. It is to be understood that these elements are described only for the purpose of illustration without suggesting any limitation as to the scope of the disclosure.

In FIG. 3, the element X may represent a configured long DRX, and the element Y may represent a configured short DRX. In some embodiments the UE is configured with long DRX, X, and short DRX, Y, and it may be also configured being allowed to relax RLM/BFD measurements. For example, in some embodiments, if X>80 ms the UE may not be allowed to relax RLM or BFD. In another example, if X>80 ms while Y<=80 ms, the UE may be allowed to relax RLM/BFD. In some further examples, if X<=80 ms and Y<=80 ms the UE may be allowed to relax RLM/BFD.

In some detailed embodiments, the UE may determine that the UE is not allowed to relax RLM/BFD measurements if the configured short DRX cycle is shorter than, for example, 80 ms and/or if the configured long DRX cycle is longer than, for example, 80 ms.

In example embodiments, the UE may determine that the UE is not allowed to relax RLM/BFD measurements if the configured long DRX cycle is longer than, for example, 80 ms regardless of what is the configured short DRX cycle length.

In some examples, the UE may determines that the UE is allowed to relax RLM/BFD measurements if the length of the configured short DRX cycle is, for example, 80 ms or less than, for example, 80 ms (even if or regardless of the length of the configured long DRX cycle).

Alternatively, or additionally, the UE may use shortest or longest configured DRX cycle (short or long) for determining whether the UE is allowed to relax RLM/BFD measurements. For example, if short DRX is configured with DRX cycle 80 ms or less than, for example, 80 ms, the UE may be allowed to relax RLM/BFD measurements. In another example, the UE may be allowed to relax RLM/BFD measurements if longest configured DRX cycle (long or short) is, for example, 80 ms or less than, for example, 80 ms In some embodiments, the UE may determine that the UE is not allowed to relax RLM/BFD measurements if both short DRX cycle and long DRX cycle are longer than, for example, 80 ms. In other examples, the UE may be allowed to relax RLM/BFD measurements if both short DRX cycle and long DRX cycle are shorter than, for example, 80 ms.

In some example embodiments, the UE may use the shortest configured DRX cycle for determining whether the UE is allowed to relax RLM/BFD measurements, and the UE may use longest configured DRX cycle for determining whether the UE is allowed to exit the relaxed RLM/BFD measurements. The method of this disclosure may apply when configured short DRX cycle or long DRX cycle is no longer than, for example, 80 ms.

The method of this disclosure may also apply to determine the evaluation period for relaxed RLM/BFD measurement. In some scenarios, it may not be clear what "DRX cycle" refers to when both short DRX and long DRX are configured.

In some example embodiments, the UE determines that the short DRX cycle is less than or equal to a threshold duration (such as 80 ms) and the long DRX cycle is greater than the threshold duration. The UE will determine the relaxed evaluation period for RLM/BFD measurement based on the DRX cycle which the terminal device uses to determine that the terminal device is allowed to relax the measurement, or determining the relaxed evaluation period based on the long DRX cycle. For instance, if the UE uses short DRX cycle to determine that the terminal device is allowed to relax the measurement irrespective of long DRX cycle, the relaxed evaluation period is determined based on the short DRX cycle. Alternatively, the UE may determine the relaxed evaluation period for RLM/BFD measurement based on the long DRX cycle as the UE performs relaxed measurement for both short and long DRX cycles.

In some other example embodiments, the UE determines that both the short DRX cycle and the long DRX cycle are less than or equal to a threshold duration (such as 80 ms). UE may determine the relaxed evaluation period based on either the short DRX cycle or the long DRX cycle. For instance, the relaxed evaluation period is determined always based on the long DRX cycle.

In some other example embodiments, the UE may determine that the terminal device is allowed to relax the measurement. UE may then determine the relaxed evaluation period for evaluating if the downlink radio link quality becomes worse than a threshold (e.g. Qout) based on one of the long and short DRX cycle, and determine the relaxed evaluation period for evaluating if the downlink radio link quality becomes better than a threshold (e.g. Qin) based on the other one of the long and short DRX cycle.

In some other embodiments, when the UE is configured with short DRX cycle and long DRX cycle, the UE may or may not trigger RLM/BFD measurements relaxation status reporting when the relaxation status was changed due to transition from using short DRX cycle to long DRX cycle (or from using long DRX cycle to short DRX cycle).

Alternatively, or additionally, the UE may or may not initiate UE Assistance Information procedure for RLM/BFD measurements relaxation status reporting when the relaxation status was changed due to transition from using short DRX cycle to long DRX cycle (or from using long DRX cycle to short DRX cycle).

In some examples, the UE may exclude RLM/BFD relaxation state reporting due to the UE going to long DRX cycle from short DRX cycle or UE going to short DRX cycle from long DRX cycle In some embodiments, the UE may determine to initiate transmission of the UEAssistanceInformation message to provide the relaxation state of RLM/BFD measurements of the cell group if the relaxation state of RLM/BFD measurements for the cell group is currently different from the relaxation state reported in the last transmission of the UEAssistanceInformation message including rlm/bfd-MeasRelaxationState of the cell group and the change of relaxation state was not (or was) due to transition from using short DRX cycle to long DRX cycle (or from using long DRX cycle to short DRX cycle).

In some embodiments, an apparatus capable of performing any of the method 200A (for example, the terminal device 110) may comprise means for performing the respective steps of the method 200A. The means may be implemented in any suitable form. For example, the means may be implemented in a circuitry or software module.

In some embodiments, the apparatus comprises means for determining a short discontinuous reception (DRX) cycle and a long DRX cycle configured for the terminal device; and means for determining, based on at least one of the short DRX cycle or the long DRX cycle, at least one of (i) whether the terminal device is allowed to relax a measurement, or (ii) a relaxed evaluation period for the measurement.

In some embodiments, the means for determining whether the terminal device is allowed to relax the measurement comprises: means for determining that the terminal device is allowed to relax the measurement regardless of the long DRX cycle based on determining that the short DRX cycle is less than or equal to a threshold duration. In some embodiments, the means for determining whether the terminal device is allowed to relax the measurement comprises: means for determining that the terminal device is allowed to relax the measurement based on determining that the short DRX cycle is less than or equal to a threshold duration and the long DRX cycle is greater than the threshold duration.

In some embodiments, the means for determining whether the terminal device is allowed to relax the measurement comprises: means for determining that the terminal device is allowed to relax the measurement based on determining that the short DRX cycle is less than or equal to a threshold duration. In some further embodiments, the means for determining whether the terminal device is allowed to relax the measurement comprises: means for determining that the terminal device is not allowed to relax the measurement based on determining that the short DRX cycle is greater than the threshold duration.

In some example embodiments, the apparatus further comprises means for determining whether the terminal device is allowed to exit the relaxed measurement based on the short DRX cycle. In some example embodiments, the means for determining the evaluation period for the measurement comprises: means for, based on determining that the short DRX cycle is less than or equal to a threshold duration and the long DRX cycle is greater than the threshold duration, determining the relaxed evaluation period based on the DRX cycle which the terminal device uses to determine that the terminal device is allowed to relax the measurement, or determining the relaxed evaluation period based on the long DRX cycle.

In some further embodiments, the means for determining the evaluation period for the measurement comprises: means for, based on determining that both the short DRX cycle and the long DRX cycle are less than or equal to a threshold duration, determining the relaxed evaluation period based on either the short DRX cycle or the long DRX cycle.

In some further embodiments, the means for determining the evaluation period for the measurement comprises: means for, based on determining that the terminal device is allowed to relax the measurement, determining the relaxed evaluation period for evaluating if the downlink radio link quality becomes worse than a threshold based on one of the long and short DRX cycle, and means for determining the relaxed evaluation period for evaluating if the downlink radio link quality becomes better than a threshold based on the other one of the long and short DRX cycle. In some further embodiments, the threshold duration is 80 milliseconds. In some example embodiments, the measurement comprises radio link monitoring (RLM) measurement and/or beam failure detection (BFD) measurement.

In some embodiments, the apparatus further comprises means for performing other steps in some embodiments of the method 200a. In some embodiments, the means comprises at least one processor and at least one memory including computer program code, the at least one memory and computer program code configured to, with the at least one processor, cause the performance of the apparatus.

In some embodiments, an apparatus capable of performing any of the method 200B (for example, the terminal device 110) may comprise means for performing the respective steps of the method 200B. The means may be implemented in any suitable form. For example, the means may be implemented in a circuitry or software module.

In some example embodiments, the apparatus comprises: means for determining a short discontinuous reception (DRX) cycle and a long DRX cycle configured for the terminal device; means for detecting a transition from using one of the short DRX cycle or the long DRX cycle to using the other one of the short DRX cycle and the long DRX cycle; and means for preventing from reporting a relaxation state of the measurement due to the transition In some example embodiments, the apparatus further comprises means for determining that a relaxation state of a measurement is changed due to the transition. In some example embodiments, the apparatus further comprises means for determining, based on at least one of the short DRX cycle or the long DRX cycle, whether the terminal device is allowed to relax a measurement.

In some example embodiments, the apparatus further comprises means for preventing from initiating a UE assistance information procedure for reporting the relaxation state of the measurement. In some example embodiments, the apparatus further comprises means for excluding the reporting of the relaxation state of the measurement from a UE assistance information procedure.

In some example embodiments, the apparatus further comprises means for determining that a relaxation state of a measurement is changed due to reasons other than the transitioning; and means for reporting the current relaxation state of the measurement.

In some example embodiments, the apparatus further comprises means for comparing the relaxation state of the measurement with a previously reported relaxation state of the measurement, and means for reporting current relaxation state of the measurement based on determining that the relaxation state is different from the previously reported relaxation state, wherein the reporting comprises initiating a UE assistance information procedure for reporting the relaxation state of the measurement, and means for preventing from reporting the current relaxation state of the measurement based on determining that the relaxation state is the same as the previously reported relaxation state. In some example embodiments, the measurement comprises radio link monitoring (RLM) measurement and/or beam failure detection (BFD) measurement.

In some embodiments, the apparatus further comprises means for performing other steps in some embodiments of the method 200b. In some embodiments, the means comprises at least one processor and at least one memory including computer program code, the at least one memory and computer program code configured to, with the at least one processor, cause the performance of the apparatus.

Figure 4:
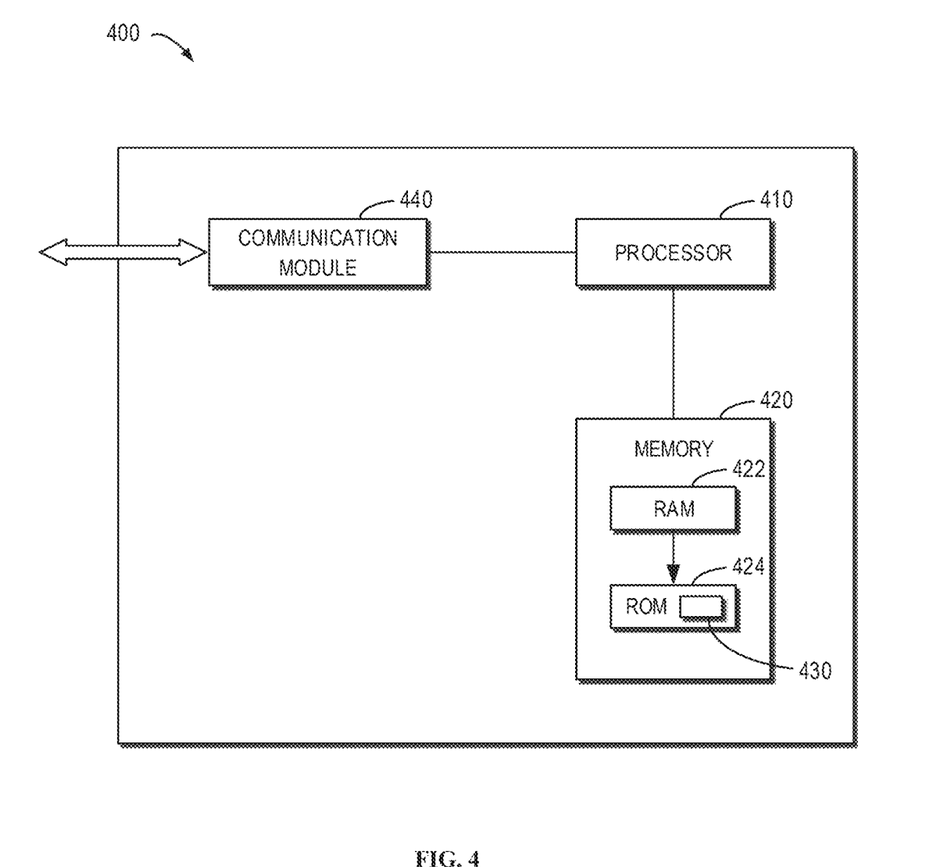
FIG. 4 illustrates a simplified block diagram of a device that is suitable for implementing some example embodiments of the present disclosure.

FIG. 4 illustrates simplified block diagram of a device 400 that is suitable for implementing some example embodiments of the present disclosure. The device 400 may be provided to implement a communication device, for example, the terminal device 110 and the network device 120 as shown in FIG. 1A. As shown, the device 400 includes one or more processors 410, one or more memories 420 coupled to the processor 410, and one or more communication modules 440 coupled to the processor 410.

The communication module 440 is for bidirectional communications. The communication module 440 has at least one antenna to facilitate communication. The communication interface may represent any interface that is necessary for communication with other network elements.

The processor 410 may be of any type suitable to the local technical network and may include one or more of the following: general purpose computers, special purpose computers, microprocessors, digital signal processors (DSPs) and processors based on multicore processor architecture, as non-limiting examples. The device 400 may have multiple processors, such as an application specific integrated circuit chip that is slaved in time to a clock which synchronizes the main processor.

The memory 420 may include one or more non-volatile memories and one or more volatile memories. Examples of the non-volatile memories include, but are not limited to, a Read Only Memory (ROM) 424, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 422 and other volatile memories that will not last in the power-down duration.

A computer program 430 includes computer executable instructions that are executed by the associated processor 410. The program 430 may be stored in the ROM 424. The processor 410 may perform any suitable actions and processing by loading the program 430 into the RAM 422.

The embodiments of the present disclosure may be implemented by means of the program 430 so that the device 400 may perform any process of the disclosure as discussed with reference to FIGS. 2A and 2B. The embodiments of the present disclosure may also be implemented by hardware or by a combination of software and hardware.

In some example embodiments, the program 430 may be tangibly contained in a computer readable medium which may be included in the device 400 (such as in the memory 420) or other storage devices that are accessible by the device 400. The device 400 may load the program 430 from the computer readable medium to the RAM 422 for execution. The computer readable medium may include any types of tangible non-volatile storage, such as ROM, EPROM, a flash memory, a hard disk, CD, DVD, and the like.

Figure 5:
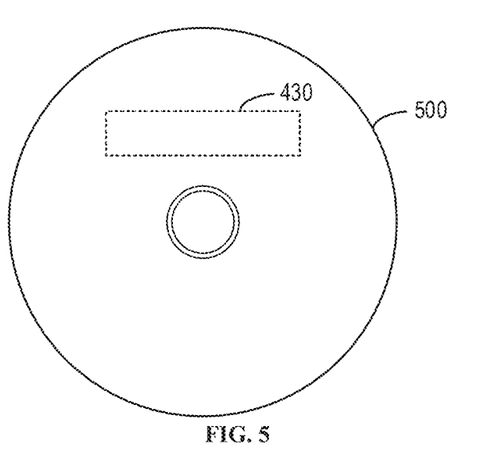
FIG. 5 illustrates a block diagram of an example of a computer readable medium 700 in accordance with some example embodiments of the present disclosure.

FIG. 5 illustrates a block diagram of an example of a computer readable medium 500 in accordance with some example embodiments of the present disclosure. The computer readable medium 500 has the program 430 stored thereon. It is noted that although the computer readable medium 500 is depicted in form of CD or DVD in FIG. 5, the computer readable medium 500 may be in any other form suitable for carry or hold the program 430.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 200a and 200b as described above with reference to FIGS. 2A and 2B. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. The term "non-transitory," as used herein, is a limitation of the medium itself (i.e., tangible, not a signal) as opposed to a limitation on data storage persistency (e.g., RAM vs. ROM).

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A terminal device comprising:
   at least one processor; and
   at least one memory storing instructions that, when executed by the at least one processor, cause the terminal device at least to:
   determine a short discontinuous reception (DRX) cycle and a long DRX cycle configured for the terminal device;
   detect a transition from using one of the short DRX cycle or the long DRX cycle to using the other one of the short DRX cycle or the long DRX cycle; and
   prevent from reporting a relaxation state of a measurement due to the transition.

2. The terminal device of claim 1, wherein the terminal device is further caused to:
   determine that the relaxation state of the measurement is changed due to the transition.

3. The terminal device of claim 2, wherein the terminal device is further caused to:
   determine, based on the short DRX cycle being less than or equal to a threshold duration and the long DRX cycle being greater than the threshold duration, that the terminal device is allowed to relax the measurement.

4. The terminal device of claim 1, wherein the terminal device is further caused to at least one of:
   prevent from initiating a UE assistance information procedure for reporting the relaxation state of the measurement, or
   exclude the reporting of the relaxation state of the measurement from the UE assistance information procedure.

5. The terminal device of claim 1, wherein the terminal device is further caused to:
   determine that the relaxation state of the measurement is changed due to a reason other than the transitioning; and
   report a current relaxation state of the measurement.

6. The terminal device of claim 5, wherein the terminal device is further caused to:
   compare the relaxation state of the measurement with a previously reported relaxation state of the measurement;
   based on determining that the relaxation state is different from the previously reported relaxation state, report the current relaxation state of the measurement, wherein the reporting comprises initiating a UE assistance information procedure for reporting the relaxation state of the measurement; and based on determining that the relaxation state is the same as the previously reported relaxation state, prevent from reporting the current relaxation state of the measurement.

7. The terminal device of claim 1, wherein the measurement comprises at least one of the following:
   a radio link monitoring (RLM) measurement; or
   a beam failure detection (BFD) measurement.

8. A method performed by a terminal device, the method comprising:
   determining a short discontinuous reception (DRX) cycle and a long DRX cycle configured for the terminal device;
   detecting a transition from using one of the short DRX cycle or the long DRX cycle to using the other one of the short DRX cycle or the long DRX cycle; and
   preventing from reporting a relaxation state of a measurement due to the transition.

* * * * *